Jan. 23, 1968   J. L. LASS ET AL   3,365,371
NUCLEAR REACTOR FUEL PELLET
Filed Oct. 14, 1966
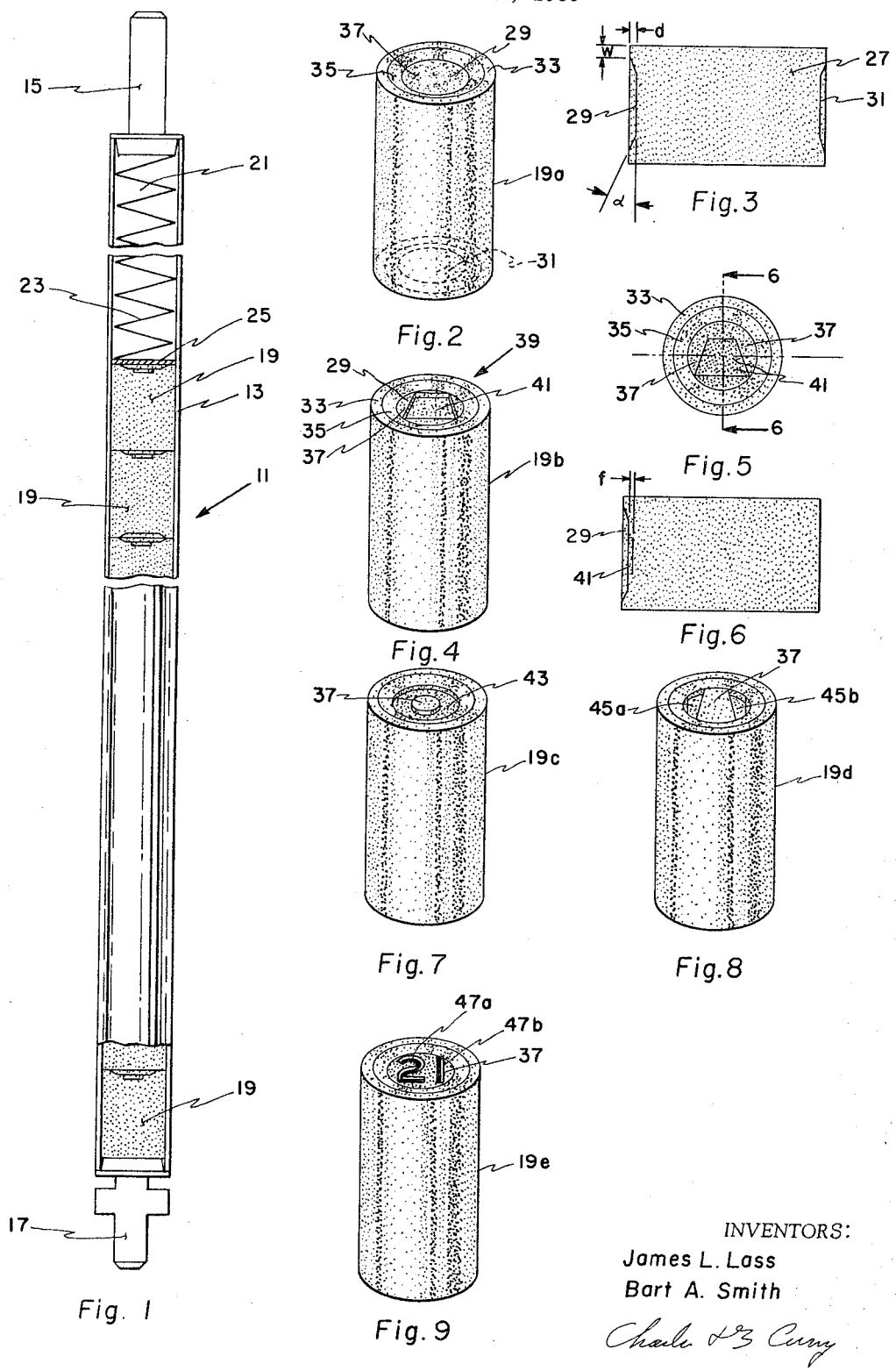
INVENTORS:
James L. Lass
Bart A. Smith
Charles B Curry

United States Patent Office 3,365,371
Patented Jan. 23, 1968

3,365,371
NUCLEAR REACTOR FUEL PELLET
James L. Lass and Bart A. Smith, San Jose, Calif., assignors to General Electric Company, a corporation of New York
Filed Oct. 14, 1966, Ser. No. 586,824
7 Claims. (Cl. 176—66)

ABSTRACT OF THE DISCLOSURE

This describes a nuclear fuel rod including a plurality of fuel pellets of cylindrical form arranged end-to-end therein wherein each fuel pellet is formed with a recess or cavity in at least one end thereof to provide free volume for accommodation of volumetric growth of the fuel during operation. A secondary cavity formed in the bottom of the primary cavity has a unique shape to identify the fuel enrichment of the pellet.

---

The present invention relates broadly to an improvement in nuclear fission reactors and more particularly to fuel for use with such nuclear fission reactors.

The release of large amounts of energy through nuclear fission reactions is now quite well known. In general, a fissile (fissionable) atom such as $U^{233}$, $U^{235}$, $Pu^{239}$, or $Pu^{241}$ absorbs a neutron in its nucleus and undergoes a nuclear disintegration. This produces on the average two fission products of lower atomic weight with great kinetic energy, and several neutrons also of high energy. For example, the fission of $U^{235}$ produces a light fission product and a heavy fission product with atomic mass numbers ranging between 80 and 110 and between 125 and 155 respectively, and an average of 2.5 neutrons. The energy release approaches 200 mev. (million electron volts) per fission.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissile material exists in the fuel to override the effects of the fission products and other neutron absorbers such as fission regulating control rods which also may be present.

In order to maintain such fission reactions at a rate sufficient to generate useful quantities of thermal energy, nuclear reactors are presently being designed, constructed, and operated in which the fissile material (nuclear fuel) is contained in the fuel elements which may have various shapes, such as plates, tubes or rods. For convenience these fuel elements will hereinafter be referred to as fuel rods. These fuel rods are usually provided on their external surfaces with a corrosion-resistant non-reactive cladding which contains no fissile or fertile material. The fuel rods are grouped together at fixed distances from each other in a coolant flow channel or region as a fuel bundle, and a sufficient number of these fuel bundles are combined to form the nuclear reaction core capable of the self-sustained fission reaction referred to above. The core is usually enclosed within a reactor vessel.

The cladding serves two primary purposes; first to resist any chemical reaction between the nuclear fuel and the moderator-coolant, and second, to prevent high radioactive fission products from being released from the fuel into the moderator-coolant. Common cladding materials are stainless steel, aluminum and its alloys, zirconium and its alloys and others. The failure of the cladding and resultant fission product release can contaminate the coolant or moderator and the coolant system with radioactive products to a degree which interferes with plant operation.

Various elemental and compound forms of the known fissionable isotopes may be employed as nuclear reactor fuel. The particularly desirable forms include those materials which are physically and chemically stable under the temperature, pressure, chemical, and irradiation conditions encountered. One particularly desirable form from these standpoints, is the so-called ceramic or refractory type. A typical ceramic uranium fuel is uranium dioxide ($UO_2$). It is chemically inert in the presence of heated or boiling water and steam, and is dimensionally stable in the presence of the intense neutron and gamma irradiation characteristic of nuclear reactors. The ceramic fuels in general and $UO_2$ in particular, have exceedingly high melting points, the melitng point of $UO_2$ being about 5,000° F.

It is desirable to maintain the temperature within the nuclear fuel as high as possible to maintain a high heat transfer rate from the nuclear fuel to the moderator-coolant of the reactor. However, the reactor is operated in such a manner as to maintain the nuclear fuel below its melting temperature. Fuel melting is undesirable because this would result in an increase in fuel volume (about 7 percent) and may also lead to undesirable fuel densification or non-uniform distribution within the fuel rod.

In high performance nuclear reactors the nuclear fuel is being subjected to greater and greater exposures in order to achieve improved performance, efficiency and operation. It has been found with exposures of from 15,000 to 25,000 mwd./t. (megawatt days per ton), for example, there is a volumetric growth of the fuel pellets that becomes significant and must be compensated for by providing additional free volume within the fuel rods. This free volume may be provided for in several ways such as forming a gap between the fuel pellets and the cladding, reducing the density of the fuel pellets or providing cavities within the fuel pellets. The volumetric growth of the fuel pellets is due to the formation of fission products in the fuel pellets which result from irrdiating the fuel during operation of the nuclear reactor. Generally, this volumetric growth takes place over a long exposure period and through a process that is believed to be a gradual plastic flow of the material from which the fuel pellets are made. Even though the fuel is prevented from melting, it has been found that the fuel growth will occupy geometric volumes having irregular configurations because of this gradual plastic flow.

In manufacturing fuel pellets it is desirable and most generally necessary to identify each fuel pellet in accordance with its particular enrichment. One such method is to form identification indentations in the fuel by means of the die from which the pellets are formed. The identification may be in the form of symbols or numbers that denote a particular enrichment.

Briefly, the present invention comprises a nuclear fuel pellet having a free volume at one end or two free volumes, one at each end. These free volumes receive the volumetric growth, by a plastic flow process, from the fuel pellet containing the free volume or from the fuel pellet adjacent the free volume, or both. For purpose of description the free volume will be referred to as being formed by a primary cavity only or a primary cavity and a secondary cavity. The primary cavity has a unique shape and forms all or a part of the required free volume. The secondary cavity is an identification indentation and generally forms the smaller part of the necessary free volume.

The end of the fuel pellet having a free volume preferably includes a flat annular rim surrounding the free volume that is formed in the center region of the end of the fuel pellet. Preferably, the primary cavity extends downwardly and inwardly from the inner edge of the flat rim and comprises a frustum conical surface that merges into a flat circular bottom that forms the base of the primary cavity. The secondary cavity is formed in the flat bottom of the primary cavity and is an identification indentation that may take the form of a symbol or number denoting the percentage concentration of fissionable material of that particular pellet. Preferably the surfaces forming the free volume are flat, rather than curved, since this permits more accurate and higher yield production of fuel pellets. Each of the symbols formed in the bottom flat surface preferably have the same volume and have a minimum depth which permits the symbol to be easily observable after the fuel pellet has been sintered during the manufacturing process. It has been found that the total free volume formed by the primary and secondary cavities effectively receive the plastic flow of the fuel pellets. The total and individual volumes of the primary and secondary cavities may be varied depending upon the anticipated exposure of the fuel pellet, the dimensions of the pellets and cladding, and other design factors.

The subject matter which is regarded as the invention is particularly pointed out and distinctly claimed in the concluding portion of the specification. The invention, however, both as to its organization and operation, together with further objects and advantages thereof, may best be understood by reference to the following description taken in conjunction with the accompanying drawings in which:

FIGURE 1 is a side view in partial cross section of a fuel rod employing the fuel pellets of the present invention;

FIGURE 2 is an isometric view of a nuclear fuel pellet provided with a free volume at each end which are formed only from primary cavities according to the present invention;

FIGURE 3 is a cross sectional view of the fuel pellet of FIGURE 2;

FIGURE 4 is an isometric view of a nuclear fuel pellet provided with a free volume at only one end which is formed from primary and secondary cavities according to the present invention;

FIGURE 5 is an end view of the fuel pellet of FIGURE 4;

FIGURE 6 is a cross sectional view of the fuel pellet of FIGURES 4 and 5;

FIGURE 7 is an isometric view of a nuclear fuel pellet having another form of secondary cavity; and FIGURE 8 is an isometric view of a nuclear fuel pellet having still another form of secondary cavities; and FIGURE 9 is an isometric view of a nuclear fuel pellet having still another form of secondary cavities.

In FIGURE 1 is illustrated fuel rod 11 made in accordance with the present invention. Fuel rod 11 includes an elongated cylindrical clad tube 13. This tube may be made of many different materials; however, it is preferably made of zirconium, since this material has a low neutron capture cross section. The top and bottom ends of the fuel rod are respectively closed by means of top end plug 15 and bottom end plug 17, both of which may be also made of zirconium. These end plugs are respectively welded or fused to the opposite ends of tube 13 to prevent the reactor coolant from contacting the fuel and to prevent fission products from escaping the fuel element. Disposed within tube 13 is a fuel material such as uranium dioxide which is in the form of pellets 19 which are placed end to end in the tube.

Fuel element 13 is also provided with a plenum chamber 21 which collects fission product gases given off by the nuclear fuel during operation in the nuclear reactor. The volume of the chamber is made large enough to accommodate at reasonable pressure fission product gases which are expected to be released by the fuel during its anticipated life cycle in the nuclear reactor. Plenum spring 23 is disposed in plenum chamber 21 and forces pellets 19 into facial contact with one another and typically exerts a force of about five pounds. This plenum spring is preferably made of Inconel-X, steel, or other material having suitable spring characteristics and preferably has a helical configuration with the outside diameter being less than the inside diameter of the tube. A flat circular wafer 25 is inserted between the bottom end of spring 23 and the upper end of uppermost pellet 19 to prevent fuel particles or chips from entering the plenum chamber and distribute the load uniformly against the uppermost pellet.

In FIGURES 2 through 9 are illustrated various forms of fuel pellets made in accordance with the present invention. Although each of these embodiments show a fuel pellet having the general geometric form of a right circular cylinder whose length is greater than its diameter, the present invention may be embodied in other solid geometric forms having non-circular cross-sections or greater or lesser length to diametric ratios, or both.

In FIGURES 2 and 3 are respectively illustrated isometric and side views of one embodiment of the fuel pellet of the present invention. This fuel pellet, referred to by reference numeral 19a, is solid and has the form of a right circular cylinder and has two primary cavities 29 and 31 respectively located at opposite ends. These primary cavities are identical in configuration and, for convenience, the following discussions will be therefore directed only to primary cavity 29. It is to be understood that pellet 19a may include only one primary cavity at one end rather than two primary cavities, one at each end. Primary cavity 29 is surrounded by a flat annular rim 33 which is provided to give a bearing surface against which the adjacent fuel pellet in fuel rod 11 will rest. Frustum conical surface 35 extends downwardly and inwardly from the inner edge of flat rim 33 and merges into flat circular surface 37 that forms the bottom of primary cavity 29. It can therefore be seen that primary cavity 29 is formed by frustum conical surface 35 and flat circular surface 37. The width ($w$) of annular rim 33 and the cone angle ($\alpha$) of frustrum conical surface 35 are selected to provide a cavity wall thickness and strength that effectively inhibits chipping or breaking the fuel material wall surrounding the primary cavity. This is particularly important since the fuel pellets are stacked in a vertical column in the fuel rod and the lowest pellets for example, must support the entire weight of the remaining pellets as well as the load exerted by plenum spring 23.

It has been found that for a fuel rod having a fuel column length of about 11 feet where the load on the lowermost pellets is about 9 pounds that, for a pellet having about a ½ inch diameter, a width ($w$) of annular rim 33 of about .05 inch and a cone angle ($\alpha$) of frustum conical surface 35 of about 45° are preferred and function satisfactorily for all conditions of loading and reactor operation. It can be seen that the volume of the primary cavity may be varied by changing the depth ($d$) while holding ($w$) and ($\alpha$) constant. This assures adequate wall support and permits variation of die configuration by the use of variable thickness shims that are attachable to the base of the die rather than requiring a family of complete dies. In addition, it has been found that cavities made from dies having straight line surfaces, such as flat circular surface 37 and the straight line cross section of frustum conical surface 35, are less expensive to form and assure more reliable performance. Even though the fuel is prevented from melting during reactor operation it has been found that the fuel growth will occupy geometric volumes having irregular configurations because of a gradual plastic flow process. For these reasons it has been found that primary cavity 29 of the present invention is particularly well suited for providing a free volume in nuclear fuel pellets.

In FIGURES 4 through 6 is illustrated another embodiment of the fuel pellet, referred to by reference numeral 19b, of the present invention which is provided with a free volume 39 that is formed from primary cavity 29 and secondary cavity 41. Primary cavity 29 of FIGURES 4 through 6 is formed in the same manner as was primary cavity 29 of FIGURES 2 and 3 and includes flat annular rim 33, frustum conical surface 35 and flat circular surface 37. However, in this embodiment secondary cavity 43, having a trapezoid configuration, is formed in flat circular surface 37. This secondary cavity has two primary functions. First, it functions as a free volume into which exposed fuel may flow. Second, it serves as an identification symbol which typically denotes the $U^{235}$ concentration of that particular pellet. This symbol is principally used for identification during fuel manufacturing or storing although it may be occasionally used for identification of the fuel after it has been exposed in the reactor and then disassembled for examination. The minimum depth (f) of secondary cavity is selected so that the identification indentation is easily observable after the fuel pellet has been sintered during the manufacturing process. The free volume of the secondary cavity is preferably made with straight edges having a slight slope to facilitate removal of the die. It has been found that the total free volume 39 formed by the primary cavity 29 and secondary cavity 41 effectively receive the plastic flow of the fuel pellets during exposure within the reactor. The total and individual volumes of the primary and secondary cavities may be varied depending upon the anticipated exposure of the fuel pellet, the dimensions of the pellets and the cladding and other design factors.

In FIGURE 7 is shown an isometric view of a nuclear fuel pellets 19c having another form of secondary cavity 43. This secondary cavity is in the form of a ring formed in flat surface 37 of the primary cavity.

In FIGURE 8 is an isometric view of a nuclear fuel pellet 19d having still another form of secondary cavities 45a and 45b. In this embodiment each of the secondary cavities 45a and 45b have irregular shapes and are spaced apart and are formed in flat surface 37 of the primary cavity.

In FIGURE 9 is an isometric view of nuclear fuel pellet 19e having still another form of secondary cavities. In this embodiment the secondary cavities 47a and 47b are digits, for example 2 and 1, formed in flat surface 37. These digits may represent a fuel enrichment of 2.1% and also serve as a free volume in the manner explained with respect to the previously described embodiments.

It will be obvious to one skilled in the art that various modifications may be made to the previously described fuel pellets. For example, the specific shape of the primary and secondary cavities may be modified and still remain within the scope of the present invention provided they function in the intended manner. It is to be understood that secondary cavities 41, 43 and 45a and 45b shown in FIGURES 4 through 8 are only examples and that many other shapes, such as rectangles, squares, circles and triangles, may be used to denote the different fuel pellet enrichments.

Various embodiments of this invention have been described and it should be understood that various other modifications and adaptations thereof may be made by those skilled in this particular art without departing from the spirit and scope of this invention as set forth in the following claims.

We claim:
1. A nuclear fuel pellet having at least one free volume comprising a primary cavity formed in at least one free end of the fuel pellet, said primary cavity positioned at about the center region of said at least one end of said fuel pellet, a flat rim surrounding said primary cavity, said primary cavity being formed by an about frustum conical surface and an about flat circular bottom, said frustum conical surface extending downwardly and inwardly from the inner edge of said flat rim, the outer edge of said flat circular bottom extending from the lower edge of said frustum conical surface and the plane of said flat bottom surface being about normal to the longitudinal axis of said fuel pellet; and a secondary cavity formed in said flat bottom surface of said primary cavity, whereby said primary cavity and said secondary cavity together are able to receive the volumetric growth of the fuel pellet containing the free volume and from another fuel pellet adjacent the free volume.

2. The fuel pellet of claim 1 wherein one primary cavity is formed at one end of said fuel pellet and another primary cavity is formed at the other end of said fuel pellet.

3. The fuel pellet of claim 1 wherein only one primary cavity is formed at only one end of said fuel pellet.

4. The fuel pellet of claim 1 wherein the cone angle of said frustum conical surface is about 45 degrees.

5. The fuel pellet of claim 1 wherein said fuel pellet has a diameter of about ½ inch, said flat rim having a width of about 0.05 inch, and the cone angle of said frustum conical surface is about 45 degrees, whereby the fuel material surrounding said free volume is of sufficient strength to withstand the forces encountered during typical reactor operation.

6. The fuel pellet of claim 1 wherein said secondary cavity has a configuration denoting the fuel enrichment of the fuel pellet in which it is formed.

7. The fuel pellet of claim 1 wherein the sides of said secondary cavity are about perpendicular to said flat circular bottom and the bottom of said secondary cavity is about parallel to said flat circular bottom.

References Cited

UNITED STATES PATENTS

| 3,022,240 | 2/1962 | Bassett | 176—74 X |
| 3,140,983 | 7/1964 | Waine | 176—90 X |
| 3,184,392 | 5/1965 | Blake | 176—73 X |
| 3,238,108 | 3/1966 | Deddens et al. | 176—73 X |

FOREIGN PATENTS

| 893,742 | 4/1962 | Great Britain. |
| 971,930 | 10/1964 | Great Britain. |

L. DEWAYNE RUTLEDGE, *Primary Examiner.*

CARL D. QUARFORTH, *Examiner.*

M. J. SCOLNICK, *Assistant Examiner.*